(12) United States Patent
Haravu

(10) Patent No.: US 11,106,385 B2
(45) Date of Patent: Aug. 31, 2021

(54) SYSTEM AND METHOD FOR GENERATING APPLICATION-CONSISTENT SNAPSHOTS

(71) Applicant: EMC IP Holding Company, LLC, Hopkinton, MA (US)

(72) Inventor: Nagasimha Haravu, Apex, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/527,330

(22) Filed: Jul. 31, 2019

(65) Prior Publication Data

US 2021/0034246 A1 Feb. 4, 2021

(51) Int. Cl.
*G06F 3/06* (2006.01)
*G06F 12/0804* (2016.01)

(52) U.S. Cl.
CPC .......... *G06F 3/065* (2013.01); *G06F 3/0619* (2013.01); *G06F 3/0683* (2013.01); *G06F 12/0804* (2013.01); *G06F 2212/1032* (2013.01)

(58) Field of Classification Search
CPC .............................. G06F 3/065; G06F 3/0683
USPC ........................................................ 711/162
See application file for complete search history.

(56) References Cited

U.S. PATENT DOCUMENTS

| 2005/0050110 | A1* | 3/2005 | Sawdon | G06F 11/1435 |
| 2005/0246575 | A1* | 11/2005 | Chen | G06F 11/2076 714/6.12 |
| 2006/0206536 | A1* | 9/2006 | Sawdon | G06F 11/2097 |
| 2013/0031058 | A1* | 1/2013 | Adkins | G06F 16/2365 707/649 |
| 2017/0011059 | A1* | 1/2017 | Stokely | G06F 3/067 |
| 2017/0277739 | A1* | 9/2017 | Joseph | G06F 3/0643 |
| 2017/0351434 | A1* | 12/2017 | Nakajima | G06F 3/0683 |
| 2020/0042398 | A1* | 2/2020 | Martynov | G06N 20/00 |

OTHER PUBLICATIONS

Author unknown, "Checkpoints and the Active Portion of the Log," https://docs.microsoft.com/en-us/previous-versions/sql/sql-server-2008-r2/ms189573(v=sql . . . Aug. 1, 2019; posted on Oct. 3, 2012; pp. 2-6.
Author unknown, "The Secret of the Database Boot Page," Home » Blog » The Secret of the Database Boot Page, May 28, 2014—General, Series, SQL Server Internals, Storage Wednesday; Sqlity.net, pp. 1-11.

* cited by examiner

*Primary Examiner* — Than Nguyen

(74) *Attorney, Agent, or Firm* — Brian J. Colandreo; Mark H. Whittenberger; Holland & Knight LLP

(57) ABSTRACT

A method, computer program product, and computing system for receiving a request for an application-consistent snapshot of at least a portion of a storage array. A plurality of I/O operations submitted to the at least a portion of the storage array may be monitored. A pre-defined pattern of I/O operations may be identified from the plurality of I/O operations submitted to the storage array. A snapshot of the at least a portion of the storage array may be generated.

14 Claims, 5 Drawing Sheets

SYSTEM AND METHOD FOR GENERATING APPLICATION-CONSISTENT SNAPSHOTS

BACKGROUND

Storing and safeguarding electronic content may be beneficial in modern business and elsewhere. Accordingly, various methodologies may be employed to communicate data between storage processors and storage arrays more efficiently. Snapshots are an effective way to preserve data utilized by applications. However, the ability to efficiently generate snapshots is impacted by the deployment of application-aware agents on a host.

SUMMARY OF DISCLOSURE

In one example implementation, a computer-implemented method executed on a computing device may include but is not limited to receiving a request for an application-consistent snapshot of at least a portion of a storage array. A plurality of I/O operations submitted to the at least a portion of the storage array may be monitored. A pre-defined pattern of I/O operations may be identified from the plurality of I/O operations submitted to the storage array. A snapshot of the at least a portion of the storage array may be generated.

One or more of the following example features may be included. The at least a portion of the storage array may include a database. The plurality of I/O operations submitted to the storage array may include flushing one or more log pages and one or more data pages from a cache memory system to the at least a portion of the storage array. The plurality of I/O operations submitted to the storage array may include one or more I/O operations associated with one or more log files and one or more I/O operations associated with one or more data files. Identifying the pre-defined pattern of I/O operations may include identifying a fixed size write operation to the one or more log files and a fixed size write operation to the one or more data files. Receiving the request for the application-consistent snapshot of the at least a portion of storage array may include receiving a pre-defined application-consistency time limit for identifying the pre-defined pattern of I/O operations from the plurality of I/O operations. Generating the snapshot of the at least a portion of the storage array may include at least one of generating an application consistent snapshot of the at least a portion of the storage array in response to identifying the pre-defined pattern of I/O operations from the plurality of I/O operations within the pre-defined application-consistency time limit and generating a crash-consistent snapshot of the at least a portion of the storage array in response to not identifying the pre-defined pattern of I/O operations from the plurality of I/O operations within the pre-defined application-consistency time limit.

In another example implementation, a computer program product resides on a computer readable medium that has a plurality of instructions stored on it. When executed by a processor, the instructions cause the processor to perform operations that may include but are not limited to receiving a request for an application-consistent snapshot of at least a portion of a storage array. A plurality of I/O operations submitted to the at least a portion of the storage array may be monitored. A pre-defined pattern of I/O operations may be identified from the plurality of I/O operations submitted to the storage array. A snapshot of the at least a portion of the storage array may be generated.

One or more of the following example features may be included. The at least a portion of the storage array may include a database. The plurality of I/O operations submitted to the storage array may include flushing one or more log pages and one or more data pages from a cache memory system to the at least a portion of the storage array. The plurality of I/O operations submitted to the storage array may include one or more I/O operations associated with one or more log files and one or more I/O operations associated with one or more data files. Identifying the pre-defined pattern of I/O operations may include identifying a fixed size write operation to the one or more log files and a fixed size write operation to the one or more data files. Receiving the request for the application-consistent snapshot of the at least a portion of storage array may include receiving a pre-defined application-consistency time limit for identifying the pre-defined pattern of I/O operations from the plurality of I/O operations. Generating the snapshot of the at least a portion of the storage array may include at least one of generating an application consistent snapshot of the at least a portion of the storage array in response to identifying the pre-defined pattern of I/O operations from the plurality of I/O operations within the pre-defined application-consistency time limit and generating a crash-consistent snapshot of the at least a portion of the storage array in response to not identifying the pre-defined pattern of I/O operations from the plurality of I/O operations within the pre-defined application-consistency time limit.

In another example implementation, a computing system includes at least one processor and at least one memory architecture coupled with the at least one processor, wherein the computing system is configured to perform operations that may include but are not limited to receiving a request for an application-consistent snapshot of at least a portion of a storage array. A plurality of I/O operations submitted to the at least a portion of the storage array may be monitored. A pre-defined pattern of I/O operations may be identified from the plurality of I/O operations submitted to the storage array. A snapshot of the at least a portion of the storage array may be generated.

One or more of the following example features may be included. The at least a portion of the storage array may include a database. The plurality of I/O operations submitted to the storage array may include flushing one or more log pages and one or more data pages from a cache memory system to the at least a portion of the storage array. The plurality of I/O operations submitted to the storage array may include one or more I/O operations associated with one or more log files and one or more I/O operations associated with one or more data files. Identifying the pre-defined pattern of I/O operations may include identifying a fixed size write operation to the one or more log files and a fixed size write operation to the one or more data files. Receiving the request for the application-consistent snapshot of the at least a portion of storage array may include receiving a pre-defined application-consistency time limit for identifying the pre-defined pattern of I/O operations from the plurality of I/O operations. Generating the snapshot of the at least a portion of the storage array may include at least one of generating an application consistent snapshot of the at least a portion of the storage array in response to identifying the pre-defined pattern of I/O operations from the plurality of I/O operations within the pre-defined application-consistency time limit and generating a crash-consistent snapshot of the at least a portion of the storage array in response to not identifying the pre-defined pattern of I/O operations from the plurality of I/O operations within the pre-defined application-consistency time limit.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
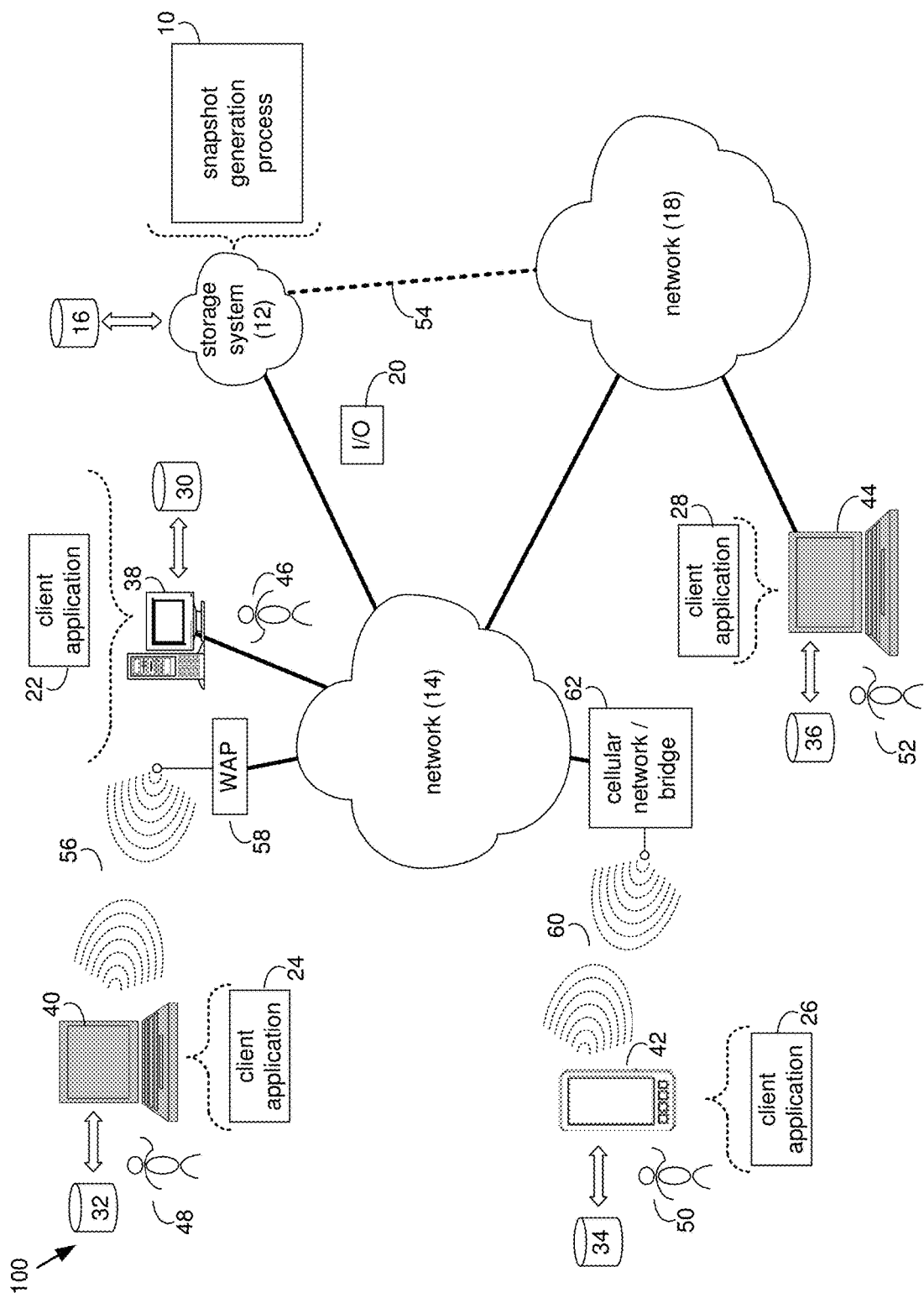
FIG. 1 is an example diagrammatic view of a storage system and a snapshot generation process coupled to a distributed computing network according to one or more example implementations of the disclosure.

Referring to FIG. 1, there is shown snapshot generation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of snapshot generation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of snapshot generation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as snapshot generation process 10 of FIG. 1, may include but is not limited to, receiving a request for an application-consistent snapshot of at least a portion of a storage array. A plurality of I/O operations submitted to the at least a portion of the storage array may be monitored. A pre-defined pattern of I/O operations may be identified from the plurality of I/O operations submitted to the storage array. A snapshot of the at least a portion of the storage array may be generated.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
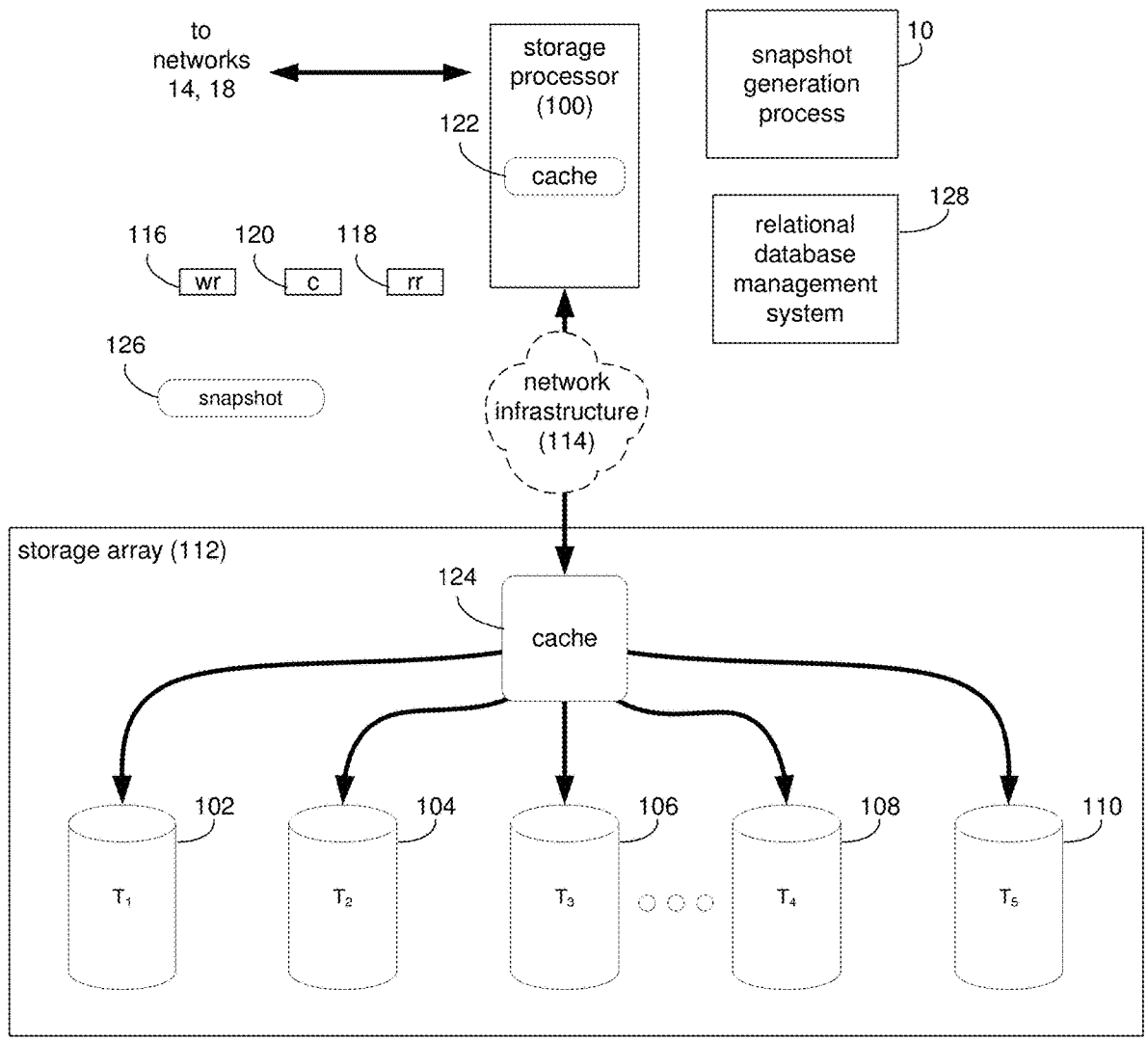
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network. As will be discussed in greater detail below and in some embodiments, network infrastructure 114 may include one or more storage fabrics. A storage fabric may generally include switches, routers, protocol bridges, gateway devices, and cables configured to connect components of storage system 12.

Storage system 12 may execute all or a portion of snapshot generation process 10. The instruction sets and subroutines of snapshot generation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of snapshot generation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 120 be written to storage system 12) and data read request 118 (i.e. a request that content 120 be read from storage system 12).

During operation of storage processor 100, content 120 to be written to storage system 12 may be processed by storage processor 100. Additionally/alternatively and when storage processor 100 is configured as an application server, content 120 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 120 within frontend cache memory system 122. Depending upon the manner in which frontend cache memory system 122 is configured, storage processor 100 may immediately write content 120 to storage array 112 (if frontend cache memory system 122 is configured as a write-through cache) or may subsequently write content 120 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 120 to be written to storage array 112 may be received from storage processor 100. Storage array 112 may initially store content 120 within backend cache memory system 124 prior to being stored on e.g. one or more of storage targets 102, 104, 106, 108, and coded target 110.

As discussed above, the instruction sets and subroutines of snapshot generation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of snapshot generation process 10 may be executed by one or more processors (not shown) and one or more memory architectures (not shown) included within storage array 112.

Further and as discussed above, during the operation of storage array 112, content (e.g., content 120) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
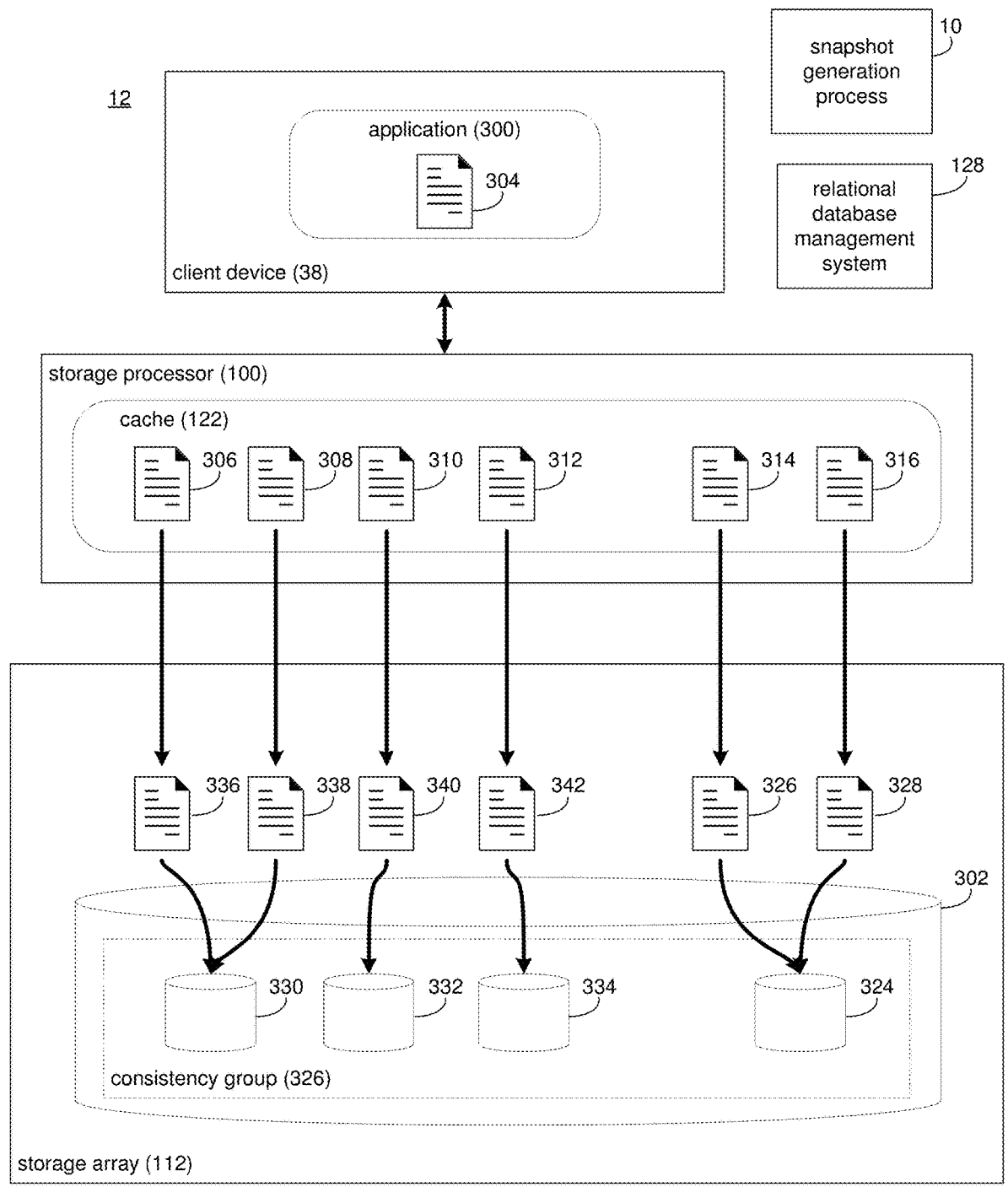

Referring also to the example of FIG. 3 and in some embodiments, storage system 12 may allow various hosts (e.g., client device 38) to execute various applications (e.g., application 300) and to access at least a portion of storage array 112. In some embodiments, the at least a portion of a storage array 112 may include a database (e.g., database 302). Examples of such a database may include, but are not limited to, relational databases (e.g., an SQL server database, Oracle Database, Sybase, etc.); object-oriented databases; etc. In the example of FIG. 3 and in some embodiments, application 300 may allow a user to generate, modify, or delete data from database 302. For example, suppose a user generates new data (e.g., data 304) via application 300. Client device 38 may transmit data 304 to storage processor 100 for storage in storage array 112 (e.g., in the form of an I/O operation (e.g., I/O operation 20)). In some embodiments, storage processor 100 may store data 304 in the form of one or more data pages (e.g., data pages 306, 308, 310, 312) and one or more log pages (e.g., log pages 314, 316) in cache memory system 122. Data pages may generally include the data created, modified, or deleted by applications. Log pages may generally include transaction records used to log an application's interactions with the database. For example, when a user creates, modifies, or deletes data of the database, a log page may be generated.

In some embodiments, a database may include one or more data storage devices (e.g., storage targets, LUNs, volumes, etc.) and one or more log storage devices (e.g., storage targets, LUNs, volumes, etc.). For example, database 302 may include one or more data storage devices (e.g., storage devices 318, 320, 322) and one or more log storage devices (e.g., storage device 324). In some embodiments, data may be written to the one or more data storage devices (e.g., storage devices 318, 320, 322) differently than in the one or more log storage devices (e.g., storage device 324). For example and in some embodiments, log pages 314, 316 may be written to log storage device 324 in a sequential I/O pattern (e.g., as log files 326, 328) whereas data pages 306, 308, 310, 312 may be written to data storage devices 330, 332, 334 in a random I/O pattern (e.g., as data files 336, 338, 340, 342).

In some embodiments, the one or more data storage devices (e.g., data storage devices 318, 320, 322) and the one or more log storage devices (e.g., log storage device 324) may be grouped into a consistency group (e.g., consistency group 326). A consistency group may generally include an addressable instance of LUN storage that can include one or more LUNs or other storage devices and may be associated with one or more attached hosts. In some embodiments, consistency groups may help organize the storage allocated for a particular host or hosts. As will be discussed in greater detail below, snapshots taken of a consistency group may apply to all LUNs or other storage devices associated with the consistency group.

In some embodiments, when an application (e.g., application 300) updates the database (e.g., data 304) and commits the transaction, transaction log entries (e.g., log pages 314, 316) may be flushed to the disk (e.g., storage devices of database 302) whereas the data pages (e.g., data pages 306, 308, 310, 312) may remain in the cache memory system until a "checkpoint" occurs. A checkpoint may generally include a point in time when all log records are written to the disk followed by all dirty data file pages from the cache memory system (e.g., cache memory system 122) being written flushed to the disk. In some embodiments, a checkpoint may be initiated automatically (e.g., periodically, based on storage system heuristics, etc.) and/or manually (e.g., in response to a checkpoint command).

In some embodiments, a snapshot may generally include a point-in-time view of a block or file resource that is associated with the point-in-time at which the snapshot was taken. After a snapshot is created, a user or administrator can perform other snapshot operations, such as restoring, copying, attaching/detaching, or deleting. In some embodiments, snapshots may be crash-consistent or application-consistent. A crash-consistent snapshot may generally include a snapshot of at least a portion of the storage array without open transactions or unflushed data in a cache memory system. As such, a crash-consistent snapshot may generally represent the at least a portion of the storage array at a particular point in time as if the storage processor (e.g., storage processor 100) had crashed. Accordingly, unflushed data may be recovered by using a log-based recovery with the log files of the database.

An application-consistent snapshot may generally include a snapshot including of at least a portion of the storage array with all transactions complete, buffers flushed, files closed, etc. In some embodiments, the application may enter what is called a "freeze." While the application is frozen, it may be locked from answering requests. In some embodiments, it may be important to keep the application frozen for as short a time as possible, so as to not to hinder the application's operations. Following the flushing, the application may be "thawed" and allowed to resume normal operations.

Conventional approaches to generating an application-consistent snapshot include quiescing (e.g., pausing) the application to flush all of its dirty pages from memory (e.g., cache memory system 122) before issuing a snapshot request. However, these conventional approaches require an application-aware agent to be installed on the host and orchestrates the "freeze" and "thaw" sequence of operations. As such, the ability to generate application-consistent snapshots using conventional approaches is limited by the requirement of installing agents on hosts and the orchestration of the freezing and thawing of an application.

Figure 4:
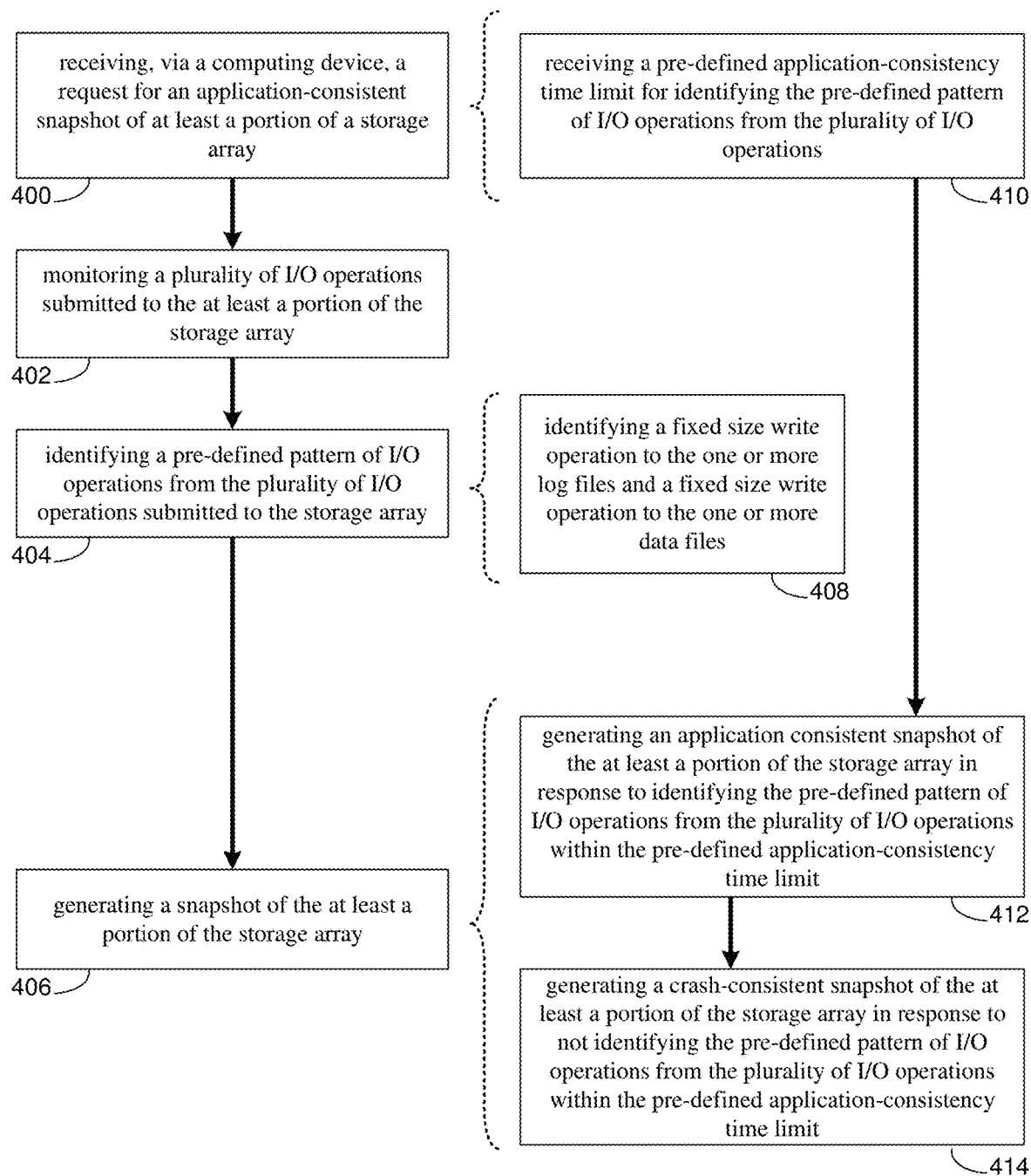
FIG. 4 is an example flowchart of the snapshot generation process of FIG. 1 according to one or more example implementations of the disclosure.
Figure 5:
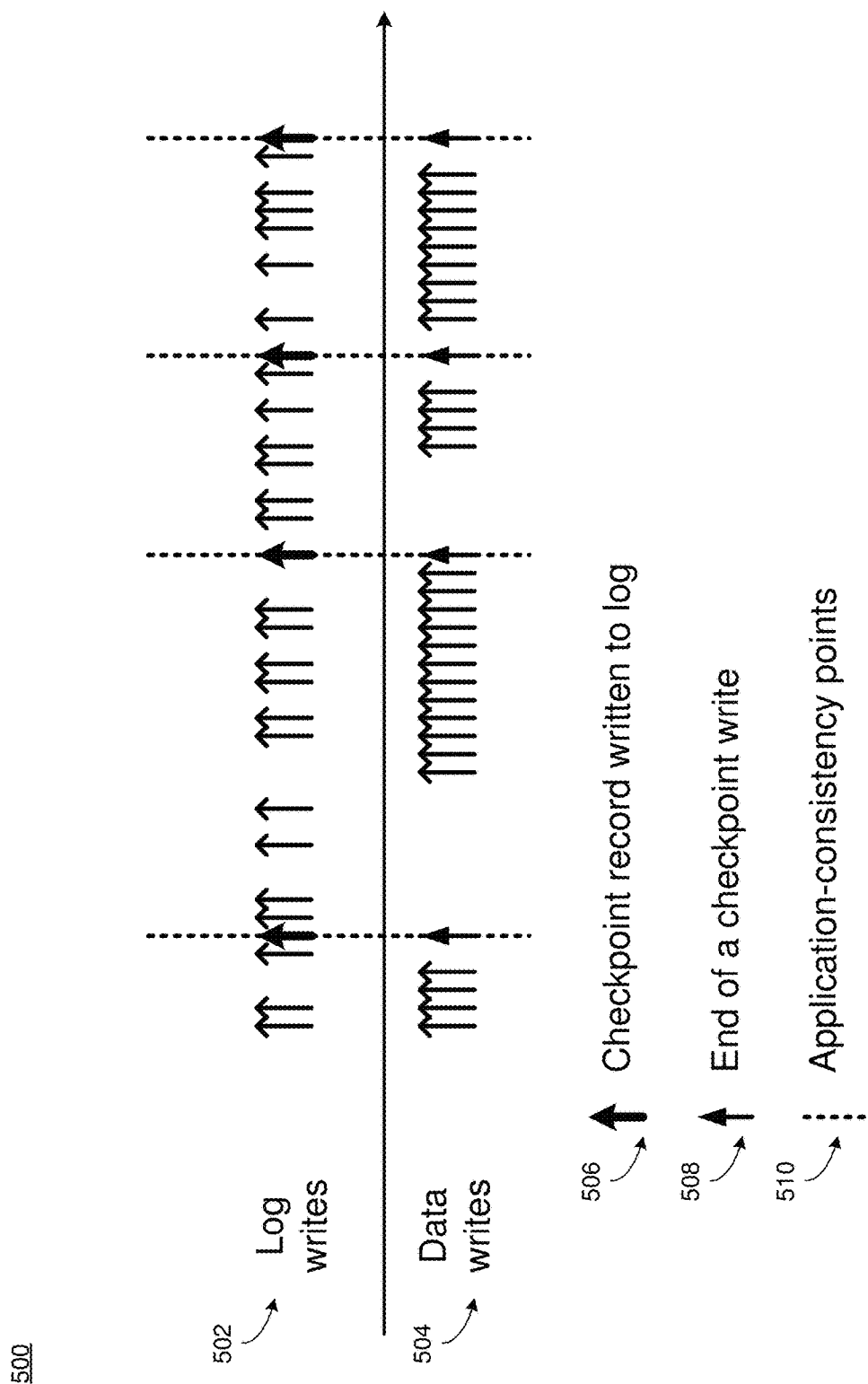
FIG. 5 is an example diagrammatic view of a plurality of I/O operations submitted to a storage array according to one or more example implementations of the disclosure.

The Snapshot Generation Process:

Referring also to FIGS. 4-5 and in some implementations, snapshot generation process 10 may receive 400 a request for an application-consistent snapshot of at least a portion of a storage array. A plurality of I/O operations submitted to the at least a portion of the storage array may be monitored 402. A pre-defined pattern of I/O operations may be identified 404 from the plurality of I/O operations submitted to the storage array. A snapshot of the at least a portion of the storage array may be generated 406.

As will be discussed in greater detail below, embodiments of the present disclosure may allow application-consistent snapshots to be generated without installing an agent on a host and/or without orchestrating quiescing of an application. For example, snapshot generation process 10 may identify one or more pre-defined I/O patterns (e.g., based on storage array analytics) to determine when to generate an application-consistent snapshot.

In some embodiments, snapshot generation process 10 may receive 400 a request for an application-consistent snapshot of at least a portion of a storage array. As discussed above and in some embodiments, a storage array (e.g., storage array 112) may be organized into one or more databases (e.g., database 302). In some embodiments, the at least a portion of the storage array may include a database and the storage processor may be a server database. A server database may generally include a server which uses a database application that provides database services to other applications or to computers, as defined by the client-server model. In some embodiments, snapshot generation process 10 may include a relational database management system (e.g., relational database management system 128) configured for storing and retrieving data as requested by other applications (e.g., application 300) which may run on the same computing device or other computing devices across a network (e.g., as shown in the example of FIG. 1). An example of a relational database management system (e.g., relational database management system 128) may include Microsoft® SQL Server™. However, it will be appreciated that other relational database management systems may be used within the scope of the present disclosure. As will be discussed in greater detail below, relational database management systems (e.g., relational database management system 128) may execute various I/O operations on the database (e.g., database 302) in response to I/O operations received from an application (e.g., application 300). These I/O operations may provide certain I/O patterns indicating that log files have been flushed to a disk and that data files have been flushed to the disk.

In some embodiments, a request for a snapshot (e.g., snapshot 126) may be received via a user interface. An example of a user interface may include a user interface of the Unisphere™ web-based storage management system of Dell EMC™. Dell Technologies, Dell, EMC, Dell EMC, and other trademarks are trademarks of Dell Inc. or its subsidiaries in the United States, other countries, or both. It will be appreciated that any storage management system user interface may be used within the scope of the present disclosure. In some embodiments, a user (e.g., user 46) may provide a request for a snapshot (e.g., snapshot 126) by manually requesting a snapshot and/or scheduling a future snapshot and/or scheduling a periodic snapshot. In some embodiments, snapshot generation process 10 may automatically generate requests for snapshot 126. In some embodiments, a user may select between a crash-consistent snapshot and an application-consistent snapshot. As discussed above, a crash-consistent snapshot may include a snapshot of at least a portion of the storage array without open transactions or unflushed data in a cache memory system while an application-consistent snapshot may include snapshot including of at least a portion of the storage array with all transactions complete, buffers flushed, files closed, etc.

In some embodiments, snapshot generation process 10 may monitor 402 a plurality of I/O operations submitted to the at least a portion of the storage array. In some embodiments, the plurality of I/O operations may be associated with a particular application (application 300). For example, as a user interacts with (e.g., creates, modifies, or deletes) data 304 of application 300, a relational database management system (e.g., relational database management system 128) may provide one or more I/O operations to storage system 12 and snapshot generation process 10 may monitor 402 the plurality of I/O operations submitted to the at least a portion of the storage array.

In some embodiments, the plurality of I/O operations submitted to the storage array include one or more I/O operations associated with one or more log pages and one or more I/O operations associated with one or more data files. For example and as discussed above, when data 304 is created, modified, or deleted, relational database management system 128 may receive the changes to application 300 in the form of one or more data pages (e.g., data pages 306, 308, 310, 312) and one or more log pages (e.g., log pages 314, 316) which may be written to the disk (e.g. storage devices 324, 330, 332, 334) as one or more data files (e.g., data files 336, 338, 340, 342) and one or more log files (e.g., log files 326, 328).

In some embodiments, the plurality of I/O operations submitted to the storage array include flushing one or more log pages and one or more data pages from a cache memory system to the at least a portion of the storage array. In some embodiments, log pages (e.g., log pages 314, 316) may be flushed from the cache memory system (e.g., cache memory system 122) when a user or an application updates the database and commits a transaction, whereas the writes to the data files (e.g., data pages 306, 308, 310, 312) may still linger in memory. As discussed above and in some embodiments, an application-consistent snapshot may require that the log pages and the data pages in memory be flushed in order to provide a snapshot of the application without processing unflushed data via a log recovery process.

In some embodiments, snapshot generation process 10 may identify 404 a pre-defined pattern of I/O operations from the plurality of I/O operations submitted to the storage array. A pre-defined pattern of I/O operations may include one or more I/O operations identified by snapshot generation process 10 indicating that the data pages (e.g., data pages 306, 308, 310, 312) and the log pages (e.g., log pages 314, 316) have been written to the disk as one or more data files (e.g., data files 336, 338, 340, 342) and one or more log files (e.g., log files 326, 328). In some embodiments and referring also to the example of FIG. 5, log page writes (e.g., log writes 502) and data page writes (e.g., data writes 504) to the disk are shown as arrows over time (along time of FIG. 5). In some embodiments, the actual flush of cache memory may occur the next time a "checkpoint" command is issued to the database. For example and in some embodiments, a "checkpoint" command may be explicitly issued or implicitly invoked under various situations by a relational database management system (e.g., relational database management system 128). In one example, a relational database management system, such as SQL Server™, may provide a checkpoint command. A checkpoint command for e.g., a SQL Server™ may include the following operations:

1. Writing a record to the log file, marking the start of the checkpoint;
2. Storing information recorded for the checkpoint in a chain of checkpoint log records;
3. Writing all dirty log and data pages to disk;
4. Writing a record marking the end of the checkpoint to the log file; and
5. Writing a log sequence number (LSN) of the start of this chain to the database boot page.

In some embodiments, identifying 404 the pre-defined pattern of I/O operations may include identifying 408 a fixed size write operation to the one or more log files and a fixed size write operation to the one or more data files. For example and as discussed above, the final two I/O operations of the example "checkpoint" command above may indicate that all dirty log and data pages are written to the disk. Referring again to the example of FIG. 5 and in some embodiments, snapshot generation process 10 may identify 408 a pre-defined I/O pattern where a fixed size write operation (e.g., write operation 508) is performed on the one or more log storage devices (e.g., log storage device 324) and a fixed size write operation (e.g., write operation 506) is performed on the one or more data storage devices (e.g., data storage devices 330, 332, 334). A fixed size may generally include a pre-defined or expected size for the write operation. In some embodiments, the fixed size write operation on the one or more log storage devices (e.g., write operation 506) may be followed by the fixed size write operation on the one or more data storage devices (e.g., write operation 508). In the example of FIG. 5 and in some embodiments, identifying 408 write operation 506 and write operation 508 may define one or more application-consistent points (e.g., application-consistent points 510). In some embodiments, the fixed size write operation on the one or more log storage devices (e.g., write operation 506) may include a record or log entry to the log storage device (e.g., log storage device 324) indicating that the data and log pages have been written or flushed to the disk (e.g., marking an end of the checkpoint to the log file (e.g., log files 326, 328)). In some embodiments, the fixed size write operation on the one or more data storage devices (e.g., write operation 508) may include a write operation to a database boot page. A database boot page may generally include a database file with variety of data about the database itself (e.g., the internal database version, the compatibility level, the database name and the date of the last log backup, etc.). In this manner, snapshot generation process 10 may "fingerprint" a pre-defined I/O pattern to identify an application-consistent point. While examples of particular fixed size write operations of the pre-defined I/O pattern have been provided, it will be appreciated that other I/O patterns, including any number of I/O operations, may be used to identify an application-consistent point or window within the scope of the present disclosure.

In some embodiments, snapshot generation process 10 may generate 406 a snapshot of the at least a portion of the storage array. As discussed above and in some embodiments, by identifying 404 an pre-defined I/O pattern, snapshot generation process 10 may identify an application-consistent point or window for generating 406 an application-consistent snapshot (e.g., snapshot 126). In some embodiments and as discussed above, generating 406 a snapshot of the at least a portion of the storage array may include generating a snapshot (e.g., snapshot 126) of a consistency group (e.g., consistency group 326) of data storage devices (e.g., data storage devices 330, 332, 334) and log storage devices (e.g., log storage devices 324).

In some embodiments, receiving 400 the request for the application-consistent snapshot of the at least a portion of storage array may include receiving 410 a pre-defined application-consistency time limit for monitoring 402 the plurality of I/O operations. For example and in some embodiments, when an application-consistent snapshot creation request is received 400, snapshot generation process 10 may apply real-time analytics to look out for the next pre-defined I/O pattern within a pre-defined application-consistency time limit or time window for monitoring 402 the plurality of I/O operations. For example, monitoring 402 the plurality of I/O operations may include processing each I/O operation to determine if it represents at least a portion of the pre-defined I/O pattern. In some embodiments, performing this monitoring may be prohibitively expensive in terms of I/O operation processing speed and resources of storage system 12. Additionally, I/O operations with the application (e.g., application 300) may be impacted by prolonged monitoring 402 of the plurality of I/O operations to identify 404 the pre-defined I/O pattern. Accordingly, a pre-defined application-consistency time limit may be defined by a user (e.g., via a user interface) or automatically by snapshot generation process 10 to limit the amount of time spent monitoring 402 the plurality of I/O operations.

In some embodiments, generating 406 the snapshot of the at least a portion of the storage array may include generating 412 an application consistent snapshot of the at least a portion of the storage array in response to identifying 404 the pre-defined pattern of I/O operations from the plurality of I/O operations within the pre-defined application-consistency time limit. For example and in some embodiments, in response to identifying 404 the pre-defined I/O pattern within the pre-define application consistency time limit, snapshot generation process 10 may generate 412 an application-consistent snapshot (e.g., snapshot 126) of at least a portion of the storage array (e.g., a snapshot of consistency group 326).

In some embodiments, generating 406 the snapshot of the at least a portion of the storage array may include generating 414 a crash-consistent snapshot of the at least a portion of the storage array in response to not identifying the pre-defined pattern of I/O operations from the plurality of I/O operations within the pre-defined application-consistency time limit. For example and in some embodiments, in response to not identifying 404 the pre-defined I/O pattern within the pre-define application consistency time limit, snapshot generation process 10 may generate 414 a crash-consistent snapshot (e.g., snapshot 126) of at least a portion of the storage array (e.g., a snapshot of consistency group 326).

As discussed above and in some embodiments of the present disclosure, snapshot generation process 10 may allow application-consistent snapshots to be generated for at least a portion of a storage array without installing an agent on the host and/or without orchestrating/coordinating the flushing of data pages and log pages to a database.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
receiving, via a computing device, a request for an application-consistent snapshot of at least a portion of a storage array;
monitoring a plurality of I/O operations submitted to the at least a portion of the storage array, wherein the plurality of I/O operations submitted to the storage array include one or more I/O operations associated with one or more log files and one or more I/O operations associated with one or more data files;
identifying a pre-defined pattern of I/O operations from the plurality of I/O operations submitted to the storage array, wherein identifying the pre-defined pattern of I/O operations includes identifying a pre-defined, fixed size log file write operation to the one or more log files and a pre-defined, fixed size data file write operation to the one or more data files; and
generating a snapshot of the at least a portion of the storage array in response to identifying the pre-defined pattern of I/O operations.

2. The computer implemented method of claim 1, wherein the at least a portion of the storage array includes a database.

3. The computer implemented method of claim 1, wherein the plurality of I/O operations submitted to the storage array include flushing one or more log pages and one or more data pages from a cache memory system to the at least a portion of the storage array.

4. The computer-implemented method of claim 1, receiving the request for the application-consistent snapshot of the at least a portion of storage array includes receiving a pre-defined application-consistency time limit for identifying the pre-defined pattern of I/O operations from the plurality of I/O operations.

5. The computer-implemented method of claim 4, generating the snapshot of the at least a portion of the storage array includes at least one of:
generating an application consistent snapshot of the at least a portion of the storage array in response to identifying the pre-defined pattern of I/O operations from the plurality of I/O operations within the pre-defined application-consistency time limit; and
generating a crash-consistent snapshot of the at least a portion of the storage array in response to not identifying the pre-defined pattern of I/O operations from the plurality of I/O operations within the pre-defined application-consistency time limit.

6. A computer program product residing on a non-transitory computer readable medium having a plurality of instructions stored thereon which, when executed by a processor, cause the processor to perform operations comprising:
receiving a request for an application-consistent snapshot of at least a portion of a storage array;
monitoring a plurality of I/O operations submitted to the at least a portion of the storage array, wherein the plurality of I/O operations submitted to the storage array include one or more I/O operations associated with one or more log files and one or more I/O operations associated with one or more data files;
identifying a pre-defined pattern of I/O operations from the plurality of I/O operations submitted to the storage array, wherein identifying the pre-defined pattern of I/O operations includes identifying a pre-defined, fixed size log file write operation to the one or more log files and a pre-defined, fixed size data file write operation to the one or more data files; and
generating a snapshot of the at least a portion of the storage array in response to identifying the pre-defined pattern of I/O operations.

7. The computer program product of claim 6, wherein the at least a portion of the storage array includes a database.

8. The computer program product of claim 6, wherein the plurality of I/O operations submitted to the storage array include flushing one or more log pages and one or more data pages from a cache memory system to the at least a portion of the storage array.

9. The computer program product of claim 6, wherein receiving the request for the application-consistent snapshot of the at least a portion of storage array includes receiving a pre-defined application-consistency time limit for identifying the pre-defined pattern of I/O operations from the plurality of I/O operations.

10. The computer program product of claim 9, wherein generating the snapshot of the at least a portion of the storage array includes at least one of:
generating an application consistent snapshot of the at least a portion of the storage array in response to identifying the pre-defined pattern of I/O operations from the plurality of I/O operations within the pre-defined application-consistency time limit; and
generating a crash-consistent snapshot of the at least a portion of the storage array in response to not identifying the pre-defined pattern of I/O operations from the plurality of I/O operations within the pre-defined application-consistency time limit.

11. A computing system comprising:
a memory; and
a processor configured to receive a request for an application-consistent snapshot of at least a portion of a storage array, wherein the processor is further configured to monitor a plurality of I/O operations submitted to the at least a portion of the storage array, wherein the plurality of I/O operations submitted to the storage array include one or more I/O operations associated with one or more log files and one or more I/O operations associated with one or more data files, wherein the processor is further configured to identify a pre-defined pattern of I/O operations from the plurality of I/O operations submitted to the storage array, wherein identifying the pre-defined pattern of I/O operations includes identifying a pre-defined, fixed size log file write operation to the one or more log files and a pre-defined, fixed size data file write operation to the one or more data files, and wherein the processor is further configured to generate a snapshot of the at least a portion of the storage array in response to identifying the pre-defined pattern of I/O operations.

12. The computing system of claim 11, wherein the at least a portion of the storage array includes a database.

13. The computing system of claim 11, wherein the plurality of I/O operations submitted to the storage array include flushing one or more log pages and one or more data pages from a cache memory system to the at least a portion of the storage array.

14. The computing system of claim 11, wherein receiving the request for the application-consistent snapshot of the at least a portion of storage array includes receiving a pre-defined application-consistency time limit for identifying the pre-defined pattern of I/O operations from the plurality of I/O operations.

\* \* \* \* \*